United States Patent [19]

Hamisch, Jr.

[11] 4,111,735

[45] Sep. 5, 1978

[54] HAND-HELD LABELER

[75] Inventor: Paul H. Hamisch, Jr., Franklin, Ohio

[73] Assignee: Monarch Marking Systems, Inc., Dayton, Ohio

[21] Appl. No.: 778,303

[22] Filed: Mar. 16, 1977

[51] Int. Cl.[2] .............................................. B32B 31/00

[52] U.S. Cl. .................................... 156/384; 156/577; 156/579; 156/584

[58] Field of Search ............... 156/384, 577, 579, 584; 101/288

[56] References Cited

U.S. PATENT DOCUMENTS

| | | | |
|---|---|---|---|
| 3,420,172 | 1/1969 | Kaplan | 156/384 |
| 3,837,966 | 9/1974 | Finke | 156/584 |
| 3,960,642 | 6/1976 | Hamisch et al. | 156/584 |

OTHER PUBLICATIONS

IBM Technical Disclosure Bulletin, vol. 18, No. 7, Dec. 1975, pp. 2256, 2257.

*Primary Examiner*—Caleb Weston
*Attorney, Agent, or Firm*—Joseph J. Grass

[57] ABSTRACT

There is disclosed a hand-held labeler having an improved applicator roll and mounting structure for an applicator roll. The mounting structure and the roll can deflect when excessive force is applied to the applicator roll to prevent damage to the apparatus.

12 Claims, 5 Drawing Figures

HAND-HELD LABELER

BACKGROUND OF THE INVENTION

1. Field of the Invention

This invention relates to the art of hand-held labelers.

2. Brief Description of the Prior Art

Some prior art hand-held labelers of the type that have a housing with a side access opening and a side panel covering the opening use an applicator roll that is rotatably mounted on a roll-mounting member such as a post which is rigidly secured to the housing or frame. In one such labeler disclosed in U.S. Pat. No. 3,960,642 to Paul H. Hamisch, Jr. et al granted June 1, 1976, wherein the applicator roll is mounted on a post secured to a frame plate. It has been found that when the labeler is dropped and the applicator roll impacts on a floor or the like the post can bend. Depending upon the amount the post is bent, there is a degradation of the ability of the roll to apply a label. Also, the impact can cause the post to bend the frame plate and this can result in misalignment of the platen so that print quality is impaired. U.S. Pat. No. 3,837,966 to Finke granted Sept. 24, 1974 discloses a helical spring for mounting an applicator roll.

SUMMARY OF THE INVENTION

In order to overcome these problems, the invention comprehends mounting the applicator roll on a member which deflects upon impact as would result when the labeler is dropped and lands on the applicator roll. The deflectable member is connected in a cantilever arrangement to the housing or frame. The deflectable member can be rigid, in which event the place where the one end portion of the deflectable member is connected to the frame would allow the deflectable member to pivot as with a ball-joint. It is preferred, however, that the deflectable member be flexible and resilient and in this regard a helical spring is most preferred. The other end portion of the deflectable member is nested in a recess in a housing panel. The panel covers a side access opening in the housing through which a roll of labels can be loaded into the labeler. When the labeler is impacted with excessive force, the roll will deflect slightly because of its resilience and the other end portion of the deflectable member will slip out of the recess. In order to reinsert the other end portion of the deflectable member onto the recess, the panel can be flexed manually and the other end portion of the deflectable member brought into alignment with the recess, and thereupon release of the panel the other end portion of the deflectable member will be received in the recess.

DESCRIPTION OF THE PREFERRED EMBODIMENT

Figure 1:
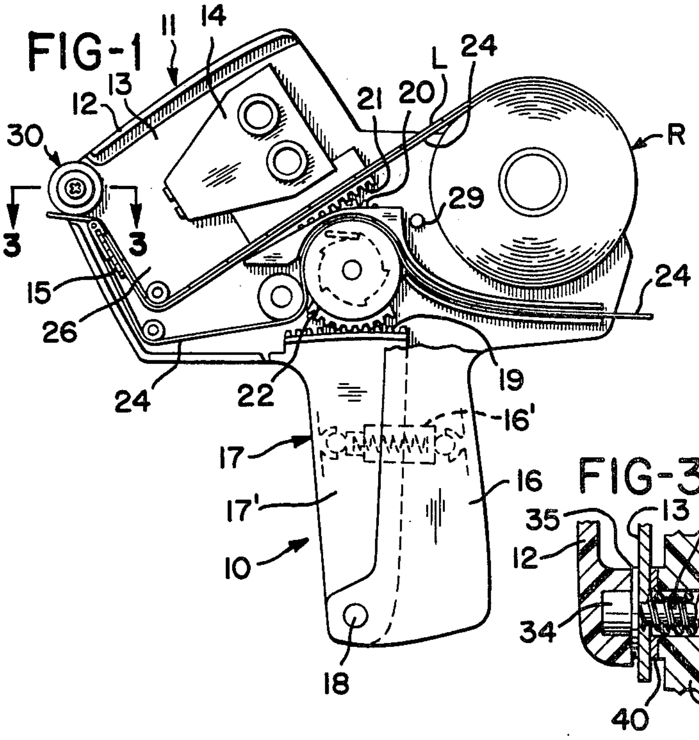
FIG. 1 is a side elevational view of a hand-held labeler incorporating the invention, showing the side panel removed.

Referring initially to FIG. 1, there is shown an apparatus for printing and applying labels generally indicated at 10 which, except for the applicator roll and its mounting structure, is shown more fully in U.S. Pat. No. 3,960,642, the disclosure of which is incorporated herein by reference. The apparatus 10 includes a frame generally indicated at 11 including a frame plate 13 which is shown to include a housing 12 and a frame plate 13. A print head 14 and a cooperable platen 15 are mounted in the frame plate 13. The housing 12 includes a handle 16. An actuator generally indicated at 17 is shown to take the form of a lever 17' pivotally mounted to the handle 16 by a pivot 18. The actuator 17 carries a gear section or segment 19 which meshes with a gear 20 which in turn meshes with a gear section or rack 21 connected to the print head 14. When the user grasps the handle 16 and pivots the actuator 17, the gear section 19, the gear 20 and the gear section 21 cause the print head 14 to move toward the platen 15. Upon release of the actuator 17, a spring assembly 16' returns the actuator 17, the gear sections 19 and 21, the gear 20 and the print head 14 to their initial positions and drives a toothed wheel 22 to advance a composite web 23 comprised of a supporting material web 24 on which labels L are carried. The pulling force is applied to the supporting material web 24 by the toothed wheel 22. As the web is advanced the supporting material web 24 is drawn around a delaminator 25.

Figure 3:
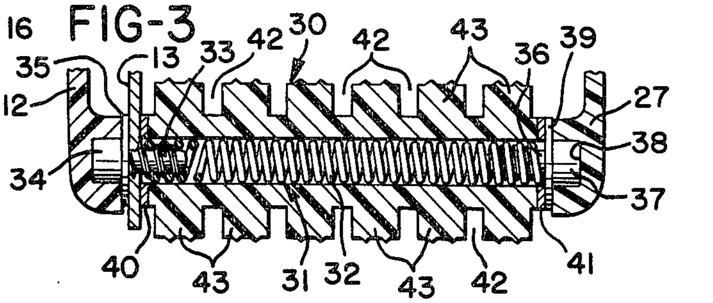
FIG. 3 is a sectional view taken along line 3—3 of FIG. 1.
Figure 4:
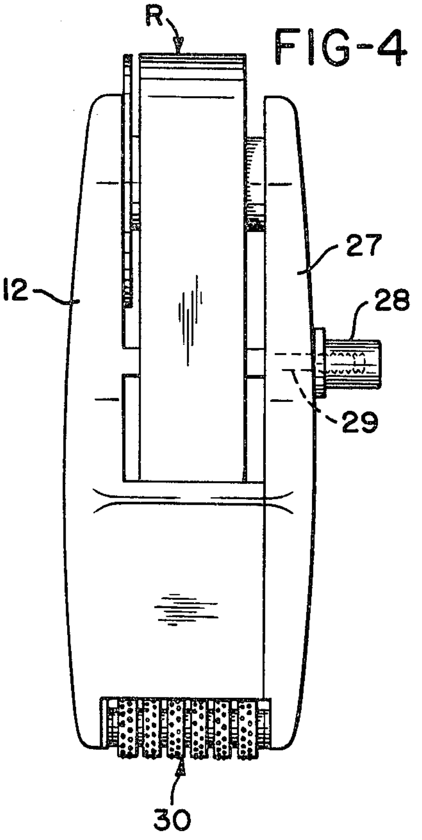
FIG. 4 is a top plan view of the labeler.

The housing 12 has a side access opening 26 into which a label roll R can be loaded into the apparatus 10. The opening 26 is normally closed off when a cover or side panel 27 is in place as best shown in FIGS. 3 and 4. The side panel 27 is shown removed in FIG. 1. The side panel 27 is normally held in place by a nut 28 threadably connected to a threaded post 29 connected to the plate 13.

Figure 2:
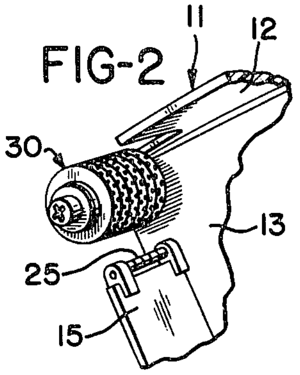
FIG. 2 is a fragmentary perspective view showing a portion of the housing, a portion of the frame plate and the applicator roll and a portion of the deflectable member that mounts the applicator roll.

Referring now to FIGS. 2 and 3, there is shown a roll generally indicated at 30. The roll 30 is rotatably mounted on a deflectable member generally indicated at 31. In the illustrated embodiment, the deflectable member is illustrated as being a helical spring 32. The deflectable member 31 is shown to be cantilever mounted to the frame 11 by a screw 33 threadably received by the plate 13 and by the turns of the spring 32. The screw 33 has a head 34 and a flange 35 which bears against the plate 13. A screw 36, which is identical to the screw 33, has a head 37 received in a recess 38 in the side plate 27. The screw 36 also has a flange 39. A washer 40 is disposed between one end of the roll 30 and the plate 13, and a washer 41 is disposed between the other end of the roll 30 and the flange 39. The threads on the screws 33 and 36 have the same pitch as the spring 32 so that they can be easily threaded into the spring 32. The roll is preferably composed of flexible resilient although relatively solid, not mushy, elastomeric material. The roll 30 is preferably of one-piece molded construction. If desired, a suitable lubricant can be applied to the spring 32 or to the inside of the roll 30 to facilitate rotation of the roll 30. The roll 30 preferably has a plurality of annular grooves 42 which define annular flanges or fins 43. The roll 30 is flexible enough and the spring 32 is flexible to permit the roll 30 to accommodate irregularities in the surface to which the label L is to be applied.

Figure 5:
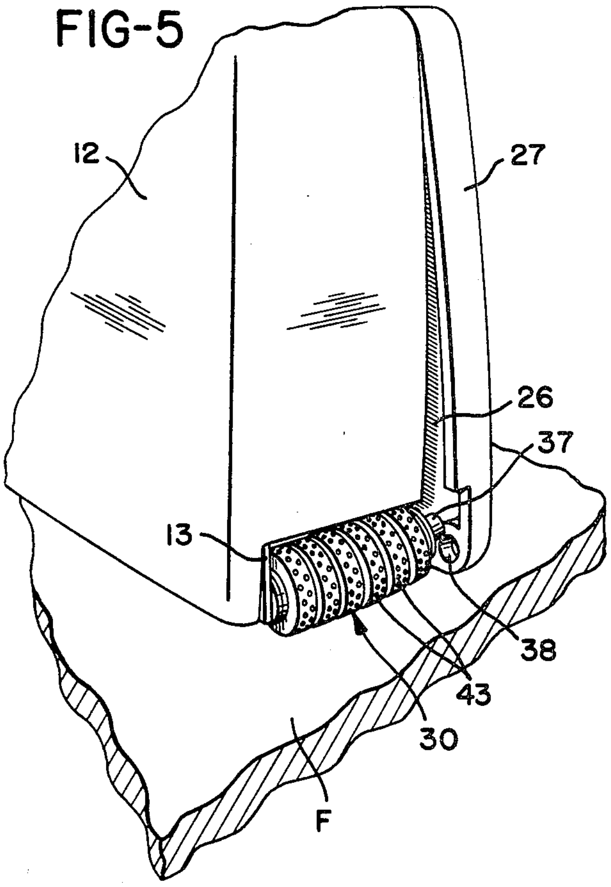
FIG. 5 is a fragmentary perspective view showing the applicator roll impacting a floor.

In the event the applicator roll 30 is impacted with excessive force, as when the apparatus 10 is dropped on a hard surface, typically a floor F, the panel 27 flexes slightly and separates from the housing 12 as shown in FIG. 5. The force applied to the applicator roll 30 causes the head 37 to slip out of the recess 38. The user can thereafter reinsert the head 37 into the recess 38. This can be done by simply flexing the panel 27 and aligning the head 37 with the recess 38 and then releasing the flexing force on the panel 27 and letting the recess 38 receive the head 37 of the screw 36.

Other embodiments and modifications of this invention will suggest themselves to those skilled in the art, and all such of these as come within the spirit of this invention are included within its scope as best defined by the appended claims.

I claim:

1. Hand-held apparatus for printing and applying pressure sensitive labels carried on a web of supporting material, comprising: a housing having a handle, a platen and a cooperable print head mounted by the housing, means mounted by the housing for delaminating printed labels from the web, an applicator roll extending beyond the outer surface of the housing for applying printed labels, means for advancing the web about the delaminating means to dispense a label into label applying relationship with respect to the applicator roll, an actuator disposed at the handle for moving the print head into cooperation with the platen and for moving the web advancing means, the housing having an access opening through which a roll of labels can be loaded into the apparatus, a removable panel covering the access opening, a deflectable roll-mounting member mounted at a first end portion to the housing, the panel having a recess, the mounting member having a second end portion nested in the recess, the roll being rotatable on and relative to the mounting member, so that in the event the second end portion of the roll-mounting member slips out of the recess in response to excessive force applied to the applicator roll the second end portion can be readily reinserted into the recess, all without damage to the apparatus.

2. Hand-held apparatus as defined in claim 1, wherein the applicator roll is of one-piece molded construction.

3. Hand-held apparatus as defined in claim 1, wherein the roll-mounting member includes a helical spring, a frame plate connected to the housing, first and second screws each including a head and a flange, the head of the first screw being received by the housing, the flange of the first screw bearing against the frame plate, the first screw being threadably received in the frame plate and in one end portion of the helical spring, a second screw threadably received in the other end portion of the helical spring, the head of the second screw being nested in the panel recess, a washer disposed between one end of the applicator roll and the frame plate, and a washer disposed between the other end of the applicator roll and the flange of the second screw.

4. Hand-held apparatus as defined in claim 1, wherein the roll-mounting member includes a helical spring, a first screw threadably received in the housing and threadably received in one end portion of the helical spring, and a second screw threadably received in the other end portion of the helical spring, the second screw having a head nested in the panel recess, wherein the pitch of the threads of the first and second screws is generally the same as the pitch of the helical spring.

5. Hand-held apparatus as defined in claim 4, wherein the first and second screws are identical.

6. Hand-held apparatus as defined in claim 1, wherein the applicator roll is composed of flexible resilient elastomeric material.

7. Hand-held apparatus as defined in claim 6, wherein the applicator roll includes a plurality of annular rings.

8. Hand-held apparatus for printing and applying pressure sensitive labels carried on a web of supporting material, comprising: a housing having a handle, a platen and a cooperable print head mounted by the housing, means mounted by the housing for delaminating printed labels from the web, an applicator roll extending beyond the outer surface of the housing for applying printed labels, means for advancing the web about the delaminating means to dispense a label into label applying relationship with respect to the applicator roll, an actuator disposed at the handle for moving the print head into cooperation with the platen and for moving the web advancing means, the housing having an access opening through which a roll of labels can be loaded into the apparatus, a removable panel covering the access opening, a deflectable roll-mounting member including a flexible resilient member mounted at a first end portion to the housing, the panel having a recess, the mounting member having a second end portion nested in the recess, the roll being rotatable on and relative to the mounting member, so that in the event the second end portion of the roll-mounting member slips out of the recess in response to excessive force applied to the applicator roll the second end portion can be readily reinserted into the recess, all without damage to the apparatus.

9. Hand-held apparatus for printing and applying pressure sensitive labels carried on a web of supporting material, comprising: a housing having a handle, a platen and a cooperable print head mounted by the housing, means mounted by the housing for delaminating printed labels from the web, an applicator roll extending beyond the outer surface of the housing for applying printed labels, means for advancing the web about the delaminating means to dispense a label into label applying relationship with respect to the applicator roll, an actuator disposed at the handle for moving the print head into cooperation with the platen and for moving the web advancing means, the housing having an access opening through which a roll of labels can be loaded into the apparatus, a removable panel covering the access opening, a deflectable roll-mounting member including a spring mounted at a first end portion to the housing, the panel having a recess, the mounting member having a second end portion nested in the recess, the roll being rotatable on and relative to the mounting member, so that in the event the second end portion of the roll-mounting member slips out of the recess in response to excessive force applied to applicator roll the second end portion can be readily reinserted into the recess, all without damage to the apparatus.

10. Hand-held apparatus for printing and applying pressure sensitive labels carried on a web of supporting material, comprising: a housing having a handle, a platen and a cooperable print head mounted by the housing, means mounted by the housing for delaminating printed labels from the web, an applicator roll extending beyond the outer surface of the housing for applying printed labels, means for advancing the web about the delaminating means to dispense a label into label applying relationship with respect to the applicator roll, an actuator disposed at the handle for moving the print head into cooperation with the platen and for moving the web advancing means, the housing having an access opening through which a roll of labels can be loaded into the apparatus, a removable panel covering the access opening, a deflectable roll-mounting member including a helical spring securely cantilevered at a first end portion to the housing, the panel having a recess, the mounting member having a second end portion nested in the recess, the roll being rotatable on and relative to the mounting member, so that in the event the second end portion of the roll-mounting member slips out of the recess in response to excessive force applied to the applicator roll the second end portion can be readily reinserted into the recess, all without damage to the apparatus.

11. Hand-held apparatus for printing and applying pressure sensitive labels carried on a web of supporting material, comprising: a housing having a handle, a platen and a cooperable print head mounted by the housing, means mounted by the housing for delaminating printed labels from the web, an applicator roll composed of flexible resilient elastomeric material and extending beyond the outer surface of the housing for applying printed labels, means for advancing the web about the delaminating means to dispense a label into label applying relationship with respect to the applicator roll, an actuator disposed at the handle for moving the print head into cooperation with the platen and for moving the web advancing means, the housing having an access opening through which a roll of labels can be loaded into the apparatus, a removable panel covering the access opening, a flexible resilient roll-mounting member cantilever mounted at a first end portion to the housing, the panel having a recess, the mounting member having a second end portion nested in the recess, the roll being rotatable on and relative to the mounting member, so that in the event the second end portion of the roll-mounting member slips out of the recess in response to excessive force applied to the applicator roll the second end portion can be readily reinserted into the recess, all without damage to the apparatus.

12. Hand-held apparatus for printing and applying pressure sensitive labels carried on a web of supporting material, comprising: a housing having a handle, a platen and a cooperable print head mounted by the housing, means mounted by the housing for delaminating printed labels from the web, an applicator roll composed of flexible resilient elastomeric material and extending beyond the outer surface of the housing for applying printed labels, means for advancing the web about the delaminating means to dispense a label into label applying relationship with respect to the applicator roll, an actuator disposed at the handle for moving the print head into cooperation with the platen and for moving the web advancing means, the housing having an access opening through which a roll of labels can be loaded into the apparatus, a removable panel covering the access opening, a deflectable roll-mounting member including a helical spring securely cantilevered at a first end portion to the housing, the panel having a recess, the mounting member having a second end portion nested in the recess, the roll being rotatable on and relative to the mounting member, so that in the event the second end portion of the roll-mounting member slips out of the recess in response to excessive force applied to the applicator roll the second end portion can be readily reinserted into the recess, all without damage to the apparatus.

* * * * *